(12) United States Patent
Heaton

(10) Patent No.: US 7,562,977 B1
(45) Date of Patent: Jul. 21, 2009

(54) EYEWEAR SECURING APPARATUS AND METHOD OF USE

(76) Inventor: Danny A. Heaton, 2428 12th Ave. NE., Watertown, SD (US) 57201

( * ) Notice: Subject to any disclaimer, the term of this patent is extended or adjusted under 35 U.S.C. 154(b) by 0 days.

(21) Appl. No.: 12/115,962

(22) Filed: May 6, 2008

(51) Int. Cl.
*G02C 3/00* (2006.01)
(52) U.S. Cl. .................... 351/155; 351/158
(58) Field of Classification Search ............ 351/41, 351/155–158
See application file for complete search history.

(56) References Cited

U.S. PATENT DOCUMENTS

| | | |
|---|---|---|
| 4,696,556 A | 9/1987 | Perry, III |
| 5,898,472 A | 4/1999 | Oshikawa |
| 5,905,560 A | 5/1999 | Daniel |
| 5,924,139 A | 7/1999 | Van Den Heuvel |
| 6,397,396 B1 | 6/2002 | Vibert |
| 6,668,426 B1 | 12/2003 | Morris |
| 7,013,491 B2 * | 3/2006 | Ferrara ............ 2/209.13 |
| 7,131,167 B2 | 11/2006 | Stagnaro |
| 7,178,278 B1 | 2/2007 | Morris |
| 7,229,172 B2 | 6/2007 | Presswood, Jr. et al. |
| 7,255,436 B2 | 8/2007 | Tracy |
| 7,325,920 B1 | 2/2008 | Gelfuso |
| 2007/0229759 A1 | 10/2007 | Jones |

\* cited by examiner

*Primary Examiner*—Huy K Mai

(57) ABSTRACT

An eyewear securing apparatus includes a clip that is removably attachable to a bottom peripheral edge of a hat. A coupler is attached to the clip. A pair of tether portions is coupled to the clip by the coupler. Each of the tether portions has a free end. A pair of sleeves is provided. The free ends each have one of the sleeves coupled thereto. Each of the sleeves has an open distal end with respect to the free ends. The temples of an eye covering are removable extendable into the sleeves to secure the eye covering to the tether portions.

14 Claims, 4 Drawing Sheets

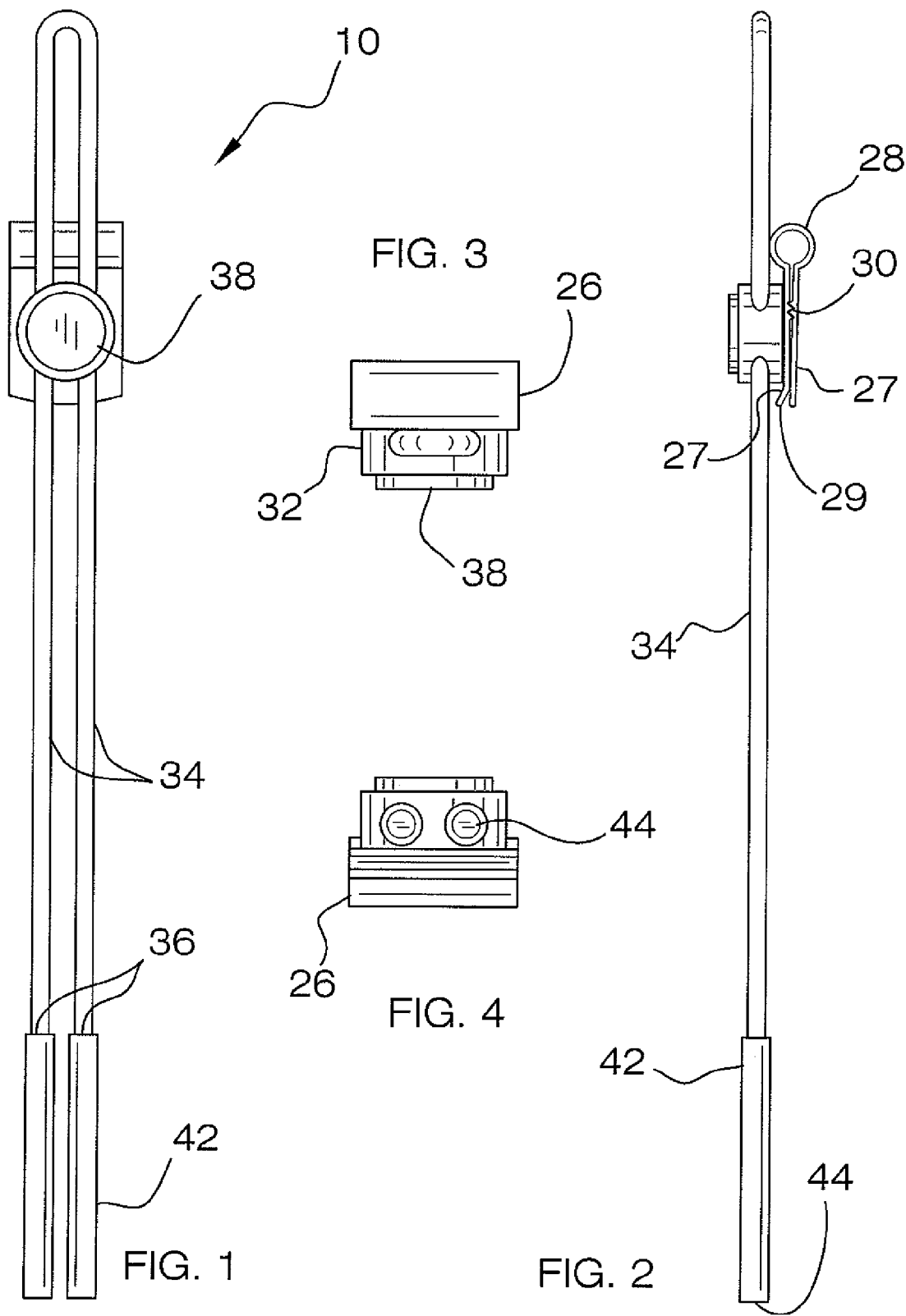

EYEWEAR SECURING APPARATUS AND
METHOD OF USE

BACKGROUND OF THE INVENTION

1. Field of the Invention

The present invention relates to eyewear securing devices and more particularly pertains to a new eyewear securing device for securing a pair of eye coverings to a hat being worn by a person to prevent the eye covering from falling away from the hat.

2. Description of the Prior Art

The use of eyewear securing devices is known in the prior art. While these devices fulfill their respective, particular objectives and requirements, the need remains for a system and method that allows a person to easily retrofit a connection between their eyewear and a hat that they are wearing. The system should allow the eyewear to be moved from person's face to the hat without concern that the eyewear will easily fall from the hat. Such a device would be particularly useful for playing sporting events as well during the shooting of firearms and hunting.

SUMMARY OF THE INVENTION

The present invention meets the needs presented above by generally comprising a clip that is removably attachable to a bottom peripheral edge of a hat. A coupler is attached to the clip. A pair of tether portions is coupled to the clip by the coupler. Each of the tether portions has a free end. A pair of sleeves is provided. The free ends each have one of the sleeves coupled thereto. Each of the sleeves has an open distal end with respect to the free ends. The temples of an eye covering are removable extendable into the sleeves to secure the eye covering to the tether portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a eyewear securing apparatus and method of use according to the present invention.

FIG. 2 is a side view of the present invention.

FIG. 3 is a rear view of the present invention.

FIG. 4 is a front view of the present invention.

Figure 5:
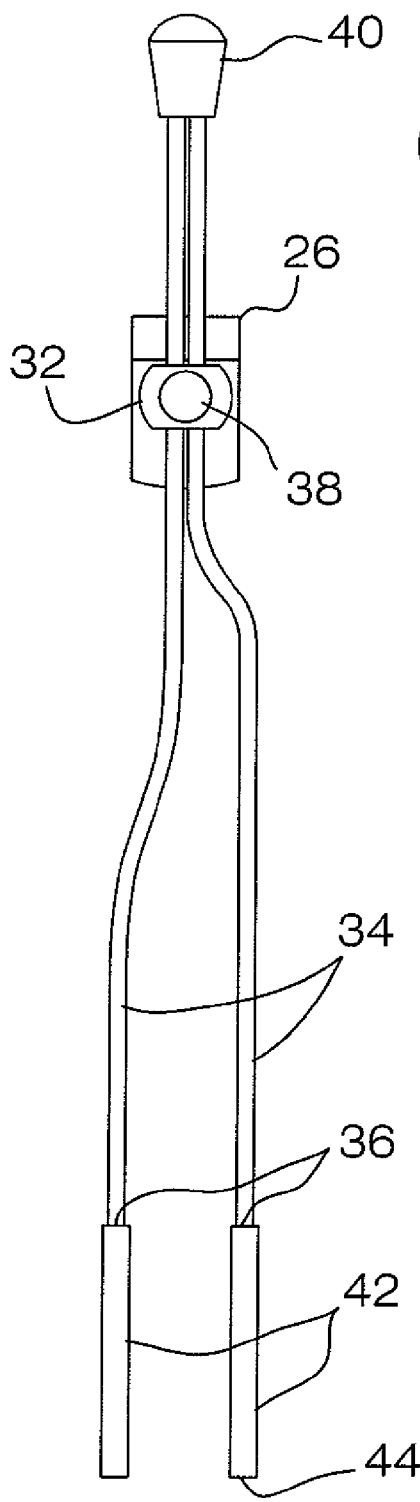
FIG. 5 is a top view of a second embodiment of the present invention.
Figure 6:
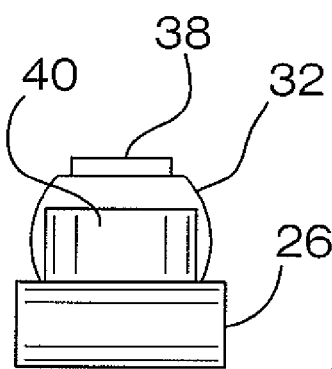
FIG. 6 is a side view of the second embodiment of the present invention.
Figure 7:
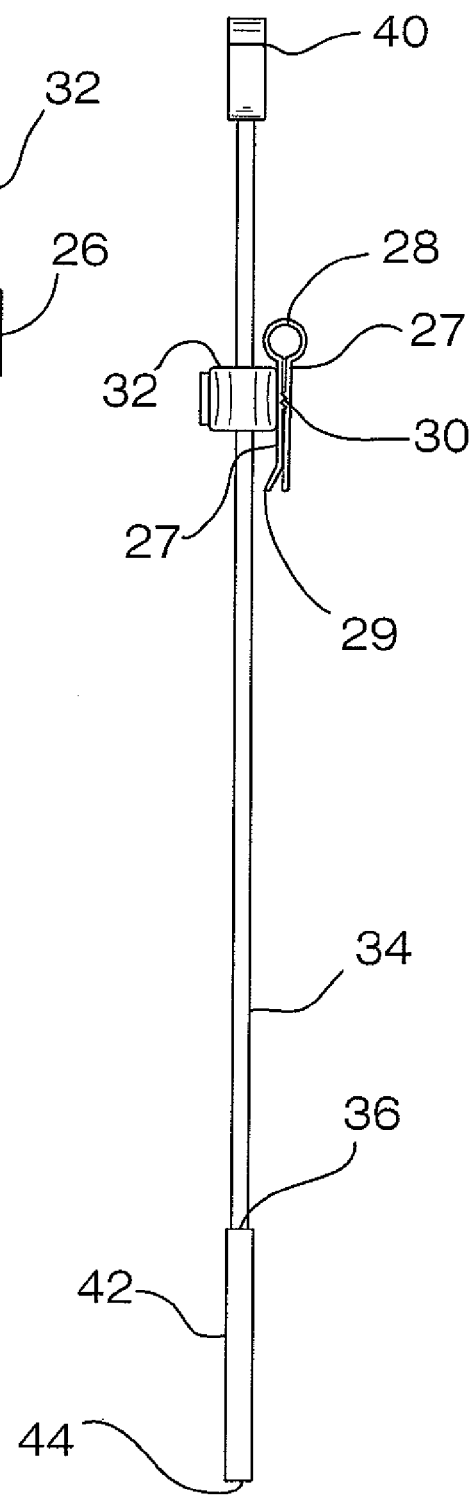
FIG. 7 is a rear view of the second embodiment of the present invention.

DESCRIPTION OF THE PREFERRED
EMBODIMENT

With reference now to the drawings, and in particular to FIGS. 1 through 10 thereof, a new eyewear securing device embodying the principles and concepts of the present invention and generally designated by the reference numeral 10 will be described.

As best illustrated in FIGS. 1 through 10, the eyewear securing apparatus 10 and method of use may also include a system further including an eye covering 12 that is conventional and includes one or more lenses 14 and a pair of temples 16. Only one of the temples 16 is shown as a right side view of FIG. 9 would be a mirror image thereof. The eye covering 12 may comprise any conventional eyewear such as reading/vision correction glasses, sunglasses, shooting/hunting eye protection and combinations thereof. The system of the apparatus 10 may also include a hat 18, such as a conventional baseball cap, with a domed upper wall 19 having a bottom perimeter edge 20. The perimeter edge 20 has a first edge 21 and a second edge 22 disposed oppositely of each other. A bill 23 is attached to and extends away from the first edge 21. The second edge 22 comprises a pair of straps 24 releasably coupled together to selectively adjust a size of the perimeter edge 20.

Figure 9:
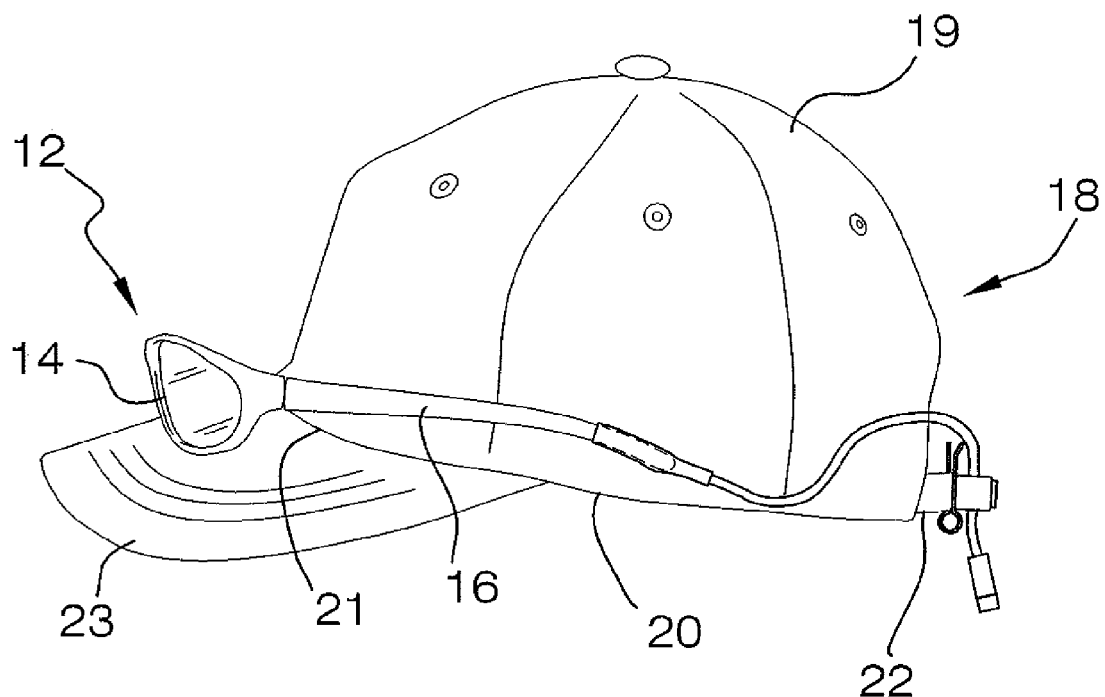
FIG. 9 is a side in-use view of the present invention.
Figure 8:
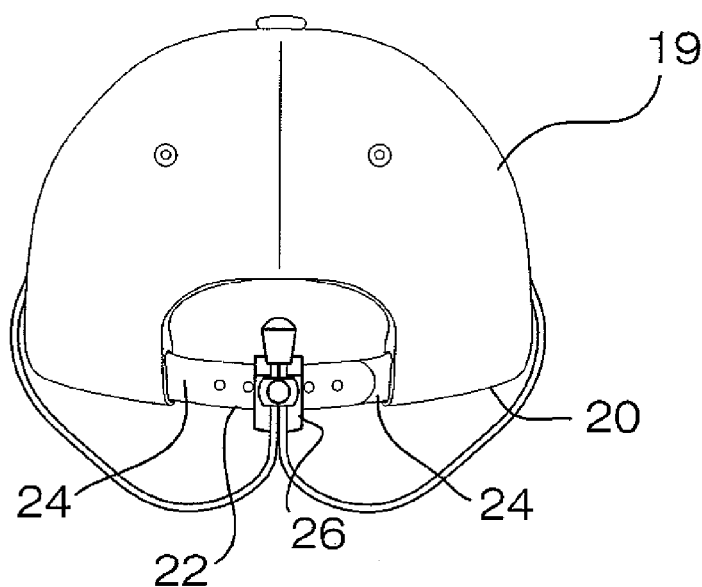
FIG. 8 is a rear in-use view of the present invention.

A clip 26 is removably attached to the hat 18. The clip 26 is removably secured to the hat 12 opposite a forward facing direction of the eye covering 12. Therefore, as shown in FIG. 9, the clip 26 may be attached to the second edge 22 of the hat 18 and shown in FIG. 10 the clip 26 may be attached to the bill 23 opposite of the second edge 22. The clip 26 includes a pair of panels 27 and a resiliently flexible central member 28 attached to the panels 27 to bias the panels 27 toward each other. One of the panels 27 has a lifted outer edge 29 to more easily position the clip 26 on the hat 18. Gripping teeth 30 may also be positioned on the panels 27.

A coupler 32 is attached to the clip 26, and in particular to one of the panels 27 of the clip 26, by either a bonding agent or integrally coupled thereto. A pair of tether portions 34 is coupled to the clip 26 by the coupler 32. In particular, the tether portions 34 each extend through the coupler 32. Each of the tether portions 34 has a free end 36 and the tether portions 32 are resiliently stretchable. The coupler 32 is slidably coupled to the tether portions 34 to allow selective positioning of the coupler 32 toward or away from the free ends 36. The coupler 32 may include a conventional actuator 38 to release a biasing member, not shown, which frictionally engages the tether portions 32. The tether portions 32 may be formed from a single piece of tether as shown in FIG. 1 or a pair of tethers having their ends joined by a connector 40 as seen in FIG. 5.

A pair of sleeves 42 is provided. Each of the free ends 36 has one of the sleeves 42 coupled thereto. The sleeves 42 each have an open distal end 44 with respect to the free ends 36. The sleeves 42 removably receive one of the temples 16 to secure the eye covering to the tether portions 34. Each of the sleeves 42 comprises a resiliently stretchable material, such as an elastomer.

Figure 10:
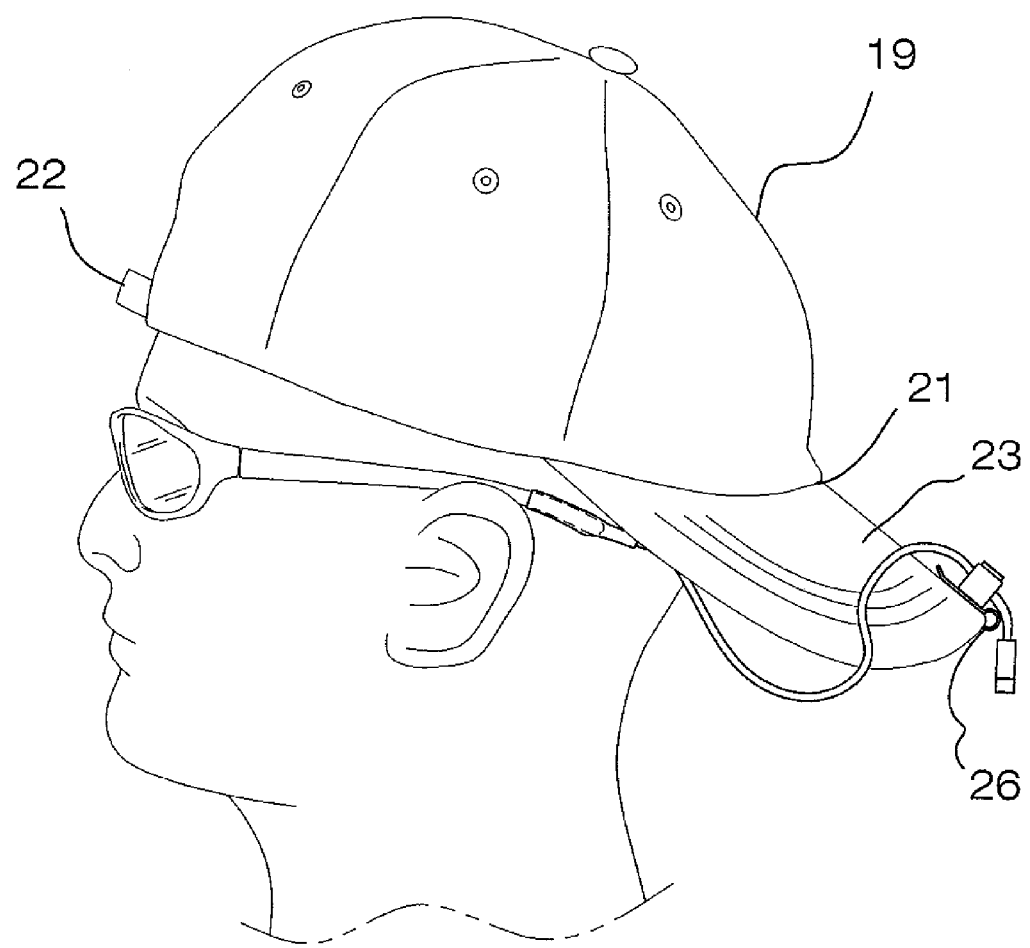
FIG. 10 is a side in-use view of the present invention in a second orientation.

In use, the temples 16 are received by the sleeves 42 as discussed above and as shown in the Figures. The clip 26 is positioned on the hat 12 so that the clip 26 is opposite of the forward direction of the eye covering 12. The coupler 32 is slid along the tether portions 34 to tighten or loosen the tether portions 34 as needed. When a person is wearing the hat 18, the eye covering 12 may be placed on their face, as shown in FIG. 10, or placed on the bill 23 for storage purposes as shown in FIG. 9. If the hat 18 is being worn backwards, as is shown in FIG. 10, the eye covering 12 may be positioned on the upper wall 19. The tether portions 34 retain the eye covering 12 on the hat 18 in a taut position to prevent it from falling or excessively moving when not being worn as eye protection.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eyewear securing system comprising:
   an eye covering including one or more lenses and a pair of temples;
   a hat including a domed upper wall having a bottom perimeter edge, said perimeter edge having a first edge and a second edge disposed oppositely of each other, a bill being attached to and extending away from said first edge;
   a clip being removably attached to said hat;
   a coupler being attached to said clip;
   a pair of tether portions being coupled to said clip by said coupler, each of said tether portions having a free end; and
   a pair of sleeves, each of said free ends having one of said sleeves coupled thereto, each of said sleeves having an open distal end with respect to said free ends, each of said sleeves removably receiving one of said temples to secure said eye covering to said tether portions.

2. The system according to claim 1, wherein said second edge of said hat comprises a pair of straps releasably coupled together to selectively adjust a size of said perimeter edge.

3. The system according to claim 2, wherein each of said sleeves comprises a resiliently stretchable material.

4. The system according to claim 3, wherein each of said tether portions is resiliently stretchable.

5. The system according to claim 4, wherein said coupler is slidably coupled to said tether portions to allow selective positioning of said coupler toward or away from said free ends.

6. The system according to claim 5, wherein said clip is removably secured to said hat opposite a forward facing direction of said eye covering, said clip being removably positioned on said bill or on said second edge of said hat.

7. The system according to claim 1, wherein each of said tether portions is resiliently stretchable.

8. The system according to claim 1, wherein said coupler is slidably coupled to said tether portions to allow selective positioning of said coupler toward or away from said free ends.

9. An eyewear securing apparatus to releasably secure an eye covering including a pair of temples to a hat having a domed upper wall with a bottom perimeter edge, the perimeter edge having a first edge and a second edge disposed oppositely of each other and a bill being attached to and extends away from said first edge, said apparatus comprising;
   a clip being removably attachable to the second edge of the hat;
   a coupler being attached to said clip;
   a pair of tether portions being coupled to said clip by said coupler, each of said tether portions having a free end; and
   a pair of sleeves, each of said free ends having one of said sleeves coupled thereto, each of said sleeves having an open distal end with respect to said free ends, the temples of the eye covering being removable extendable into the sleeves to secure the eye covering to said tether portions.

10. The apparatus according to claim 9, wherein each of said tether portions is resiliently stretchable.

11. The apparatus according to claim 9 wherein said coupler is slidably coupled to said tether portions to allow selective positioning of said coupler toward or away from said free ends.

12. The apparatus according to claim 9, wherein each of said sleeves comprises a resiliently stretchable material.

13. A method of securing eyewear comprising the steps of:
   providing an eye covering including one or more lenses and a pair of temples;
   providing a hat including a domed upper wall having a bottom perimeter edge, said perimeter edge having a first edge and a second edge disposed oppositely of each other, a bill being attached to and extending away from said first edge;
   providing a clip;
   attaching said clip to said hat to said second edge or said bill to position said clip on said hat opposite a forward facing direction of said eye covering;
   providing a coupler being attached to said clip;
   providing a pair of tether portions being coupled to said clip by said coupler, each of said tether portions having a free end, each of said tether portions being resiliently stretchable; and
   providing a pair of sleeves, each of said free ends having one of said sleeves coupled thereto, each of said sleeves having an open distal end with respect to said free ends, each of said sleeves comprising a resiliently stretchable material; and
   extending an end of said temples in each of said sleeves to secure said eye covering to said tether portions.

14. The method of claim 13, further including the steps of:
   wherein the step of providing said coupler further includes the step of said being slidably coupled to said tether portions to allow selective positioning of said coupler toward or away from said free ends; and
   adjusting a length of said tether portions from said free ends to said coupler to tighten or loosen said tether portions.

* * * * *